(12) United States Patent
Gehrke

(10) Patent No.: US 7,147,564 B2
(45) Date of Patent: Dec. 12, 2006

(54) UNIVERSAL JOINT ASSEMBLY

(75) Inventor: Glenn F. Gehrke, Davisburg, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 184 days.

(21) Appl. No.: 10/875,062

(22) Filed: Jun. 23, 2004

(65) Prior Publication Data

US 2005/0288106 A1 Dec. 29, 2005

(51) Int. Cl.
*F16D 3/205* (2006.01)
(52) U.S. Cl. .................................. 464/89; 464/124
(58) Field of Classification Search ............ 464/89, 464/111, 120–124, 905
See application file for complete search history.

(56) References Cited

U.S. PATENT DOCUMENTS

| | | | |
|---|---|---|---|
| 2,117,706 A * | 5/1938 | Cutting | ............. 464/122 |
| 2,194,798 A | 3/1940 | Koppel | |
| 2,386,754 A | 10/1945 | Ruch | |
| 2,964,928 A | 12/1960 | Marquis | |
| 3,678,708 A * | 7/1972 | Ernst et al. | ............. 464/89 X |
| 3,792,596 A | 2/1974 | Orain | |
| 3,965,701 A | 6/1976 | Orain | |
| 4,280,340 A | 7/1981 | Goguet | |
| 4,436,310 A | 3/1984 | Sawabe et al. | |
| 4,507,100 A | 3/1985 | Doré et al. | |
| 4,548,591 A | 10/1985 | Haldric et al. | |
| 5,009,628 A | 4/1991 | Rouillot | |
| 5,279,522 A | 1/1994 | Rouillot et al. | |
| 5,370,581 A * | 12/1994 | Rohrle et al. | ............. 464/89 X |
| 5,374,219 A | 12/1994 | Kohara et al. | |
| 5,460,573 A | 10/1995 | Krude | |
| 5,529,538 A | 6/1996 | Schulz et al. | |
| 5,632,682 A | 5/1997 | Krude et al. | |
| 6,342,012 B1 | 1/2002 | Dorok et al. | |
| 6,354,604 B1 | 3/2002 | Nicolai | |
| 6,398,886 B1 | 6/2002 | Fuhrmann et al. | |

* cited by examiner

*Primary Examiner*—Greg Binda
(74) *Attorney, Agent, or Firm*—Harness, Dickey & Pierce, P.L.C.

(57) ABSTRACT

A universal joint assembly includes a universal joint and a housing encasing the universal joint. An isolator encases the housing. The isolator includes at least one chamber formed therein. The housing is moveable relative to the isolator by compression of the isolator.

18 Claims, 3 Drawing Sheets

UNIVERSAL JOINT ASSEMBLY

FIELD OF THE INVENTION

The present invention relates to universal joint assemblies and more particularly to a tunable rubber isolated bipod universal joint assembly.

BACKGROUND OF THE INVENTION

The use of universal joints in automotive systems is common within the industry. Universal joints transmit constant torque through an angle between two shafts. However, it is important to reduce any noise or vibrations through the joint that may cause damage or annoyance during operation. Accordingly, isolators have been used to encase the universal joint. The isolators have typically been made from elastomeric materials that elastically deform as the universal joint moves relative to a housing surrounding the joint. In this way, the isolator absorbs a portion of the vibrations transmitted through the universal joint. While these isolators have been successful for their intended purpose, there is room in the art for improvements.

SUMMARY OF THE INVENTION

A universal joint assembly is provided. The assembly includes a universal joint and a housing encasing the universal joint. An isolator encases the housing. The isolator includes at least one chamber formed therein for defining a stiffness of the isolator. The housing is moveable relative to the isolator by compression of the isolator. The stiffness of the isolator is tunable by modifying the characteristics of the chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
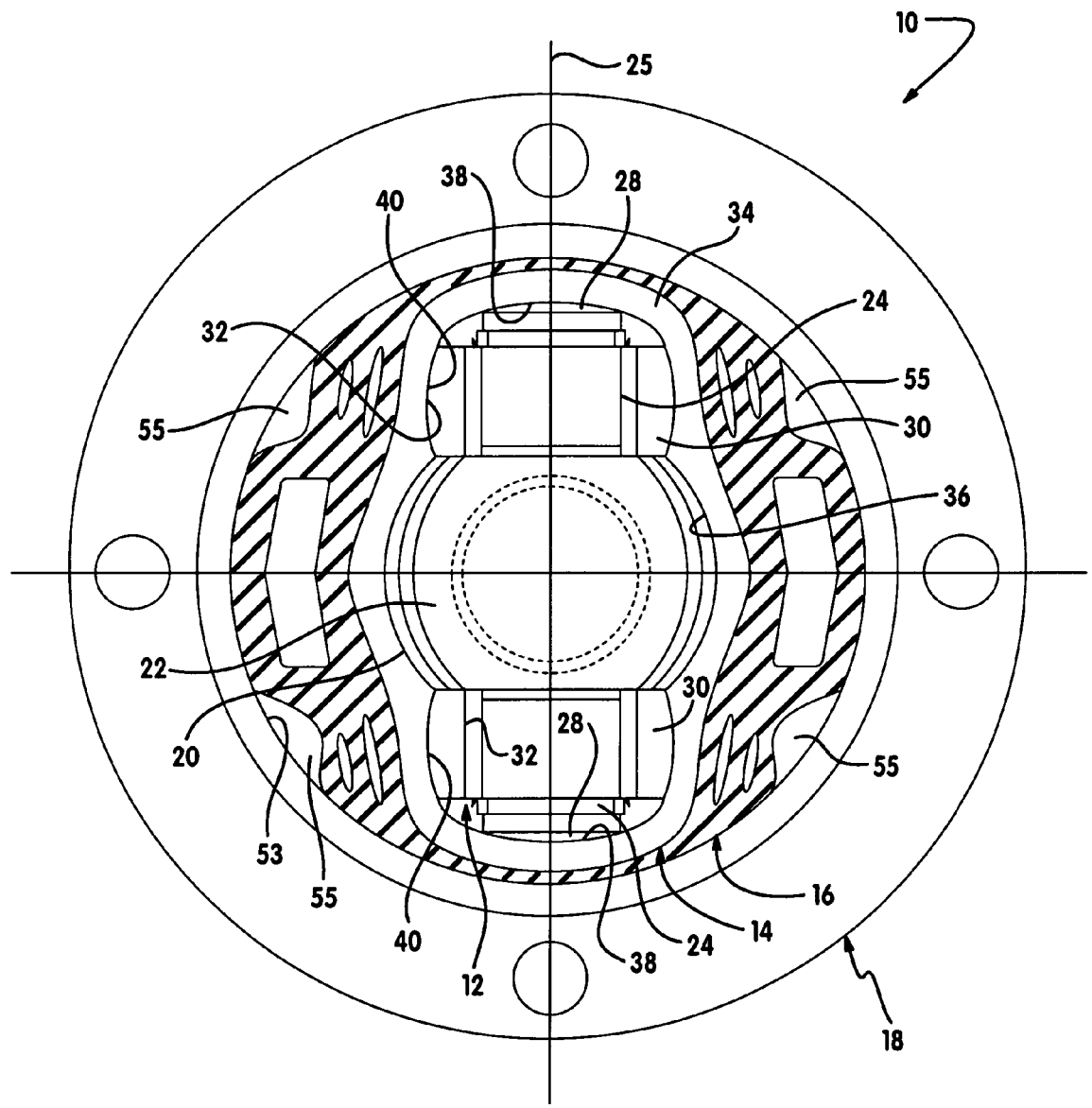
FIG. 1A is a front sectional view of a universal joint assembly constructed according to the principles of the present invention.
Figure 1B:
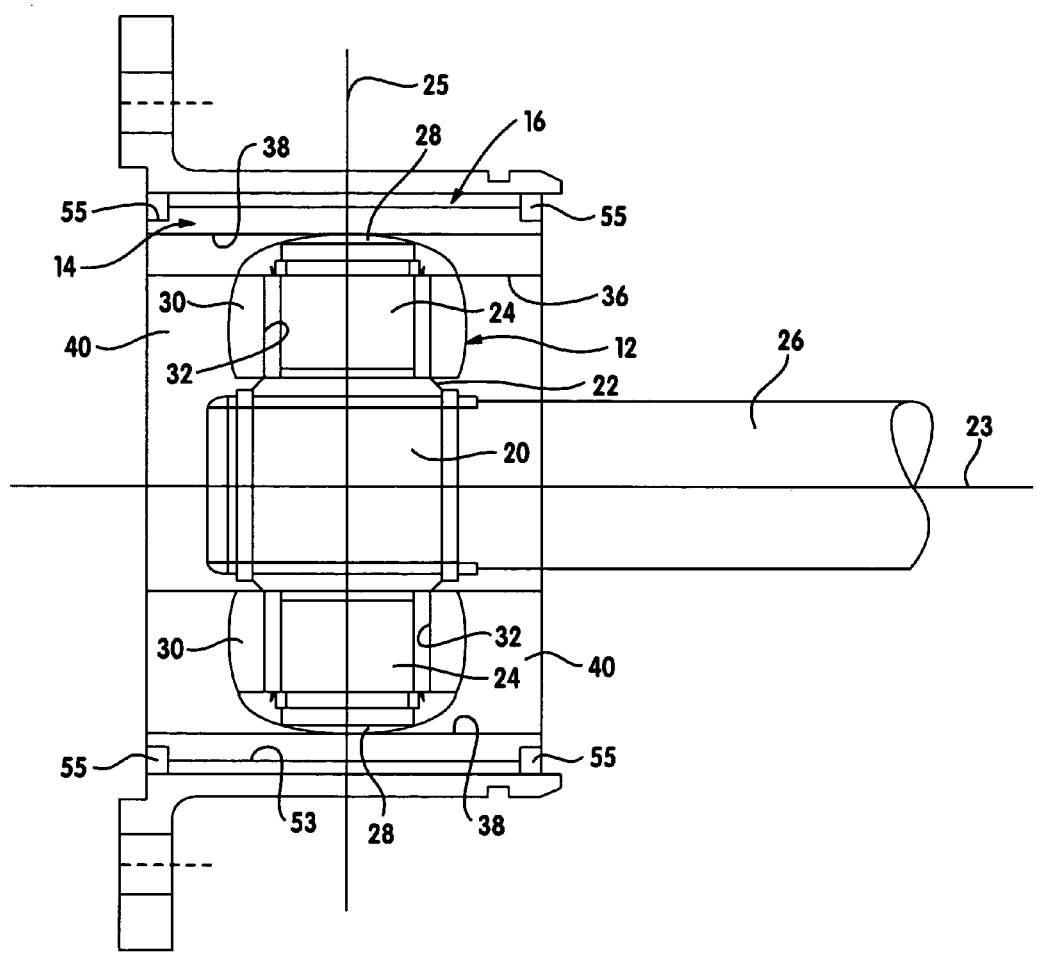
FIG. 1B is a side sectional view of universal joint assembly of the present invention.

With reference to FIGS. 1A and 1B, a bipod universal joint assembly constructed according to the principles of the present invention is generally indicated by reference numeral 10. The assembly 10 includes a bipod universal joint 12, a bipod housing 14, a tunable isolator 16, and a housing 18. In the particular example provided, the assembly 10 is used in operative association with an automotive driveshaft. However, it should be appreciated that the assembly 10 may be used in various other environments requiring torque to be transmitted through an angle.

The bipod universal joint 12 includes a spider 20 having a central hub 22 and a pair of trunnions 24 extending from opposite sides thereof. The hub 22 is coupled to a stub shaft 26 which defines a horizontal axis 23. The stub shaft 26 is in turn coupled to a conventional driveshaft tube (not shown). The trunnions 24 are generally cylindrical in shape and include spherical ends 28. The trunnions 24 define a vertical axis 25.

The bipod universal joint 12 further includes a pair of rollers 30. The rollers 30 are coupled to the trunnions 24 of the spider 20. In the example provided, the rollers 30 have a truncated spherical outer shape and a cylindrical inner bore 32. The cylindrical inner bore 32 includes a plurality of needles (not shown) along its inner circumference. Each roller 30 is fitted overtop a trunnion 24 such that the trunnion 24 fits within the cylindrical inner bore 32. The rollers 30 are able to move up and down relative to the trunnions 24 along the axis 25 and are able to rotate relative to the spider 20.

The bipod housing 14 encases the bipod universal joint 12. In the example provided, the bipod housing 14 includes a body 34 having an inner cavity 36 sized to receive the bipod universal joint 12 therein. The inner cavity 36 includes top and bottom cylindrical tracks 38 formed therein. The top and bottom cylindrical tracks 38 are sized to constrain the spherical ends 28 of the trunnions of the spider 20 therein. The inner cavity 36 further includes roller tracks 40 formed therein. The roller tracks 40 are generally cylindrical in shape and are sized to receive the rollers 30 therein. The roller tracks 40 prevent the rollers 30 from rotating relative to the bipod housing 14 while simultaneously allowing the rollers 30 (and therefore the entire universal joint 12) to move along the axis 23. The bipod universal joint 12 in conjunction with the bipod housing 14 allow torque to be transmitted through the universal joint 12 at an angle and on to a driveshaft (not shown) of the motor vehicle (not shown).

Figure 2:
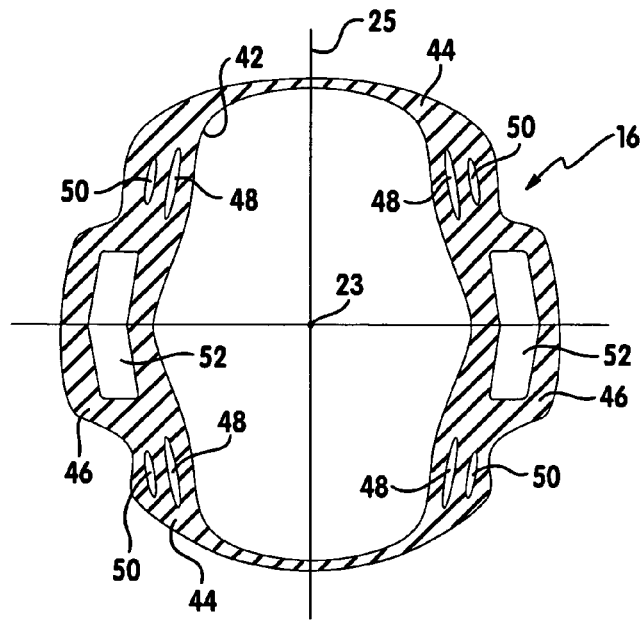
FIG. 2 is a front view of a tunable isolation member constructed according to the principles of the present invention.

The tunable isolator 16 encases the bipod housing 14. In the particular example provided, the tunable isolator 16 is made from rubber. However, it is to be appreciated that any elastomeric material may be employed with the present invention. Turning to FIG. 2, the tunable isolator 16 includes an inner socket 42 that is shaped to match the outer contour of the bipod housing 14 (FIG. 1). In the particular example provided, the tunable isolator 16 includes vertical wings 44 and horizontal wings 46. The vertical wings 44 extend generally vertically and the horizontal wings 46 extend generally horizontally. The wings 44, 46 are adapted to engage the housing 18.

Each vertical wing 44 may include a first chamber 48 and a second chamber 50. The first and second chambers 48, 50 may extend throughout the length of the tunable isolator 16 along the axis 23 and may be formed within an interior portion of the tunable isolator 16. In the particular example provided, the first and second chambers 48, 50 have an oval cross sectional shape. Moreover, the first chambers 48 are larger than the second chambers 50 and may be formed in the tunable isolator 16 at a location that is relatively closer to the inner socket 42. The horizontal wings 46 may each include a third chamber 52. The third chambers 52 may extend throughout the length of the tunable isolator 16 along the axis 23. The third chambers 52 can include a chevron, as shown in FIG. 2. The third chambers 52 are preferably larger than the first and second chambers 48, 50. The first, second, and third chambers 48, 50, 52 allow the elastomeric material of the tunable isolator 16 to compress and deflect to a greater extent (thereby partially defining the stiffness of the tunable isolator 16). It is to be appreciated that the shape, size, and location of the chambers 48, 50, and 52 within the tunable isolator 16 may be varied without departing from the scope of the present invention. Moreover, the tunable isolator 16 may include a number of chambers greater than or fewer than those illustrated and may include none of the chambers without departing from the scope of the present invention. By adjusting the properties of the chambers 48, 50, 52, the tunable isolator 16 is easily "tunable" to provide any desired stiffness.

Turning back to FIG. 1, 1A and 1B. the housing 18 receives the tunable isolator 16 and is coupled to a source of torque, such as, for example, an engine (not shown). More specifically, the housing 18 includes a control bore 53, which is sized to receive the tunable isolator 16, the bipod housing 14 and the bipod universal joint 12, and a plurality of drive tabs 55 that extend inwardly into the control bore 53 and drivingly engage the tunable isolator 16. The control bore 53 is generally cylindrical, as shown in FIG. 14. The drive tabs 55 are disposed on opposite sides of each of the horizon and vertical wings 46, 48. Accordingly, drive torque that is transmitted between the housing 18 and the stub shaft 26 (or vice versa) is transmitted through the tunable isolater 16. The tunable isolator 16 allows the bipod universal joint 12 and bipod housing 14 to move relative to the housing 18 by compression and elastic deformation of the tunable isolator 16. The stiffness of the tunable isolator 16 is determined by its geometry and material characteristics and may be designed to affect the torsional compliance of the assembly 10 in any manner desired. In the example provided, this designing or "tuning" is accomplished by adjusting the properties of the chambers 48, 50, 52.

Figure 3:
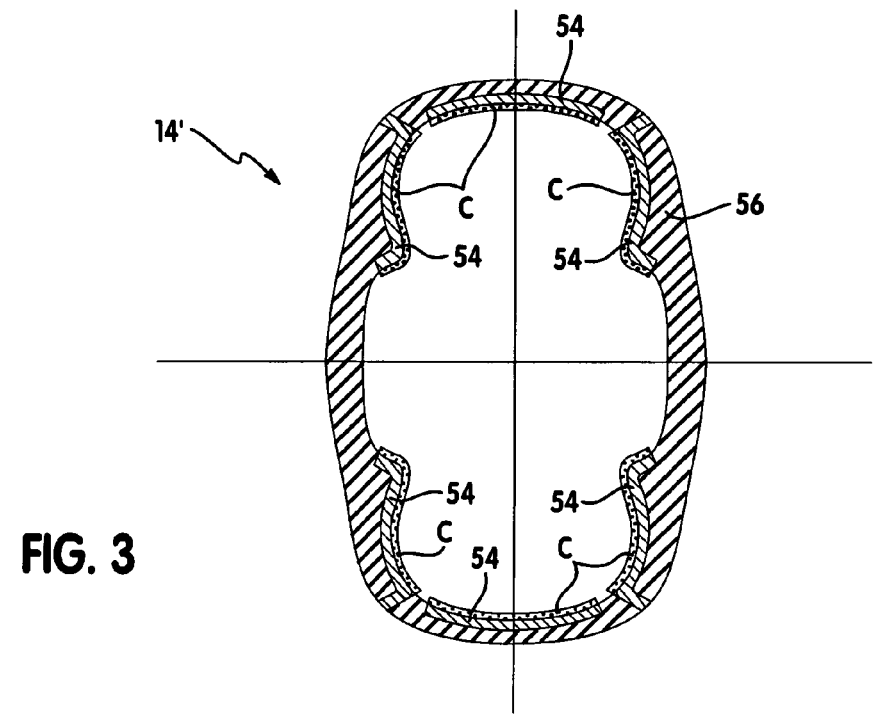
FIG. 3 is a front view of a housing member constructed according to the principles of the present invention.

With reference to FIG. 3, an alternate embodiment of the bipod housing 14 is generally indicated by reference numeral 14'. The bipod housing 14' includes a plurality of plates 54 integrated with a plastic body 56. The plates 54 may be formed of sheet steel in an appropriate process, such as stamping, though various other materials and forming processes may be employed. Additionally, the plates 50 may be heat treated and/or coated with an appropriate coating (e.g., for lubricity, corrosion, resistance and/or wear resistance). The plates 54 form the contact surfaces for the rollers 30 and the spherical ends 28 of the trunnions 24 of the spider 20 (see FIGS. 1A, 1B). In the example provided, there are six plates 54, each corresponding to a point of contact with the universal joint 12. The plates 54 contact the universal joint 12 for securing the universal joint 12 the trunnions 24 and rollers 30 of the universal joint 12, within the bipod housing 14'. The plastic body 56 is preferably a high strength thermosetting plastic which may be injected into a hold (not shown) that carries the plates 54, though various other materials may be employed. Torque transmission through the bipod housing 14' puts the plastic body 56 primarily under compression between the tunable isolator 16 (FIGS. 1A, 1B) and the rollers 30 of the universal joint 12.

Preferably, the plates 54 are positioned during or prior to molding of the plastic body 56. This allows the plates 54 to be precisely positioned relative to the rollers 30 and trunnions 24. The plates 54 are positioned such that a first pair of plates 54 contact the trunnions 24 and a second pair of plates 54 contact the rollers 30. Moreover, the plastic body 56 is relatively less expensive to manufacture and is of lighter weight than a full steel body, while the plates 54 assure that the bipod housing 14' has suitable strength and durability.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A universal joint assembly comprising:
   a universal joint;
   a housing receiving the universal joint;
   an isolator receiving the housing, the isolator including at least one chamber formed therein for defining a stiffness of the isolator, the housing moveable relative to the isolator by compression of the isolator; and
   wherein the isolator includes a first pair of wings extending vertically from opposite sides of the isolator and a second pair of wings extending horizontally from opposite sides of the isolator, the wings adapted to engage a second housing surrounding the isolator.

2. The universal joint assembly of claim 1, wherein the housing includes a plate fixed in a plastic body.

3. The universal joint assembly of claim 2, wherein the plate is positioned such that the plate contacts the universal joint for securing the universal joint within the housing.

4. The universal joint assembly of claim 3, wherein the universal joint includes a pair of trunnions and a pair of rollers, and the plate is positioned such that the plate contacts the trunnions and the rollers for partially fixing the trunnions and the rollers to the housing.

5. The universal joint assembly of claim 1, wherein the housing includes a plurality of plates fixed in a plastic body, wherein the universal joint includes a pair of trunnions and a pair or rollers, and wherein the plates are positioned such that a first pair of plates contact the trunnions, and a second pair of plates contact the rollers.

6. The universal joint assembly of claim 1, wherein the isolator is formed from an elastomeric material.

7. The universal joint assembly of claim 1, wherein each wing includes a chamber formed therein.

8. The universal joint assembly of claim 1, wherein the second housing includes tabs adapted to engage the isolator.

9. A universal joint assembly comprising:
   a universal joint having a plurality of rollers;
   a housing having a control bore;
   a body received in the control bore of the housing, the body including a plurality of tracks in which the rollers are disposed; and
   an isolator disposed between the body and the housing, the isolator being formed of a resilient material and defining at least one void space within an interior portion of the isolator that permits a first region of the isolator to compress in response to relative movement of the body to the housing and deflect to a greater extent than another region of the isolator that is located proximate the first region.

10. The universal joint assembly of claim 9, wherein the at least one void includes an aperture that is formed longitudinally through the isolator.

11. The universal joint assembly of claim 10, wherein the aperture is a chevron.

12. The universal joint assembly of claim 10, wherein the aperture has an oval shape.

13. The universal joint assembly of claim 9, wherein the control bore is generally cylindrical and the housing further includes at least one drive tab that extends radially into the control bore and engages the isolator.

14. The universal joint assembly of claim 13, wherein the isolator includes a pair of wings and wherein a pair of the drive tabs are disposed on opposite sides of each of the wings.

15. The universal joint assembly of claim 14, wherein an aperture is formed through each of the wings.

16. The universal joint assembly of claim 14, wherein the body includes a body segment and a plurality of plate segments that are fixedly coupled to the body segment, the plate segments at least partially defining the tracks.

17. The universal joint assembly of claim 16, wherein a coating is applied to the plurality of plate segments, the coating being selected to improve lubricity, corrosion resistance, wear resistance of combinations thereof.

18. The universal joint assembly of claim 9, wherein the resilient material is rubber.

* * * * *